Patented Aug. 24, 1926.

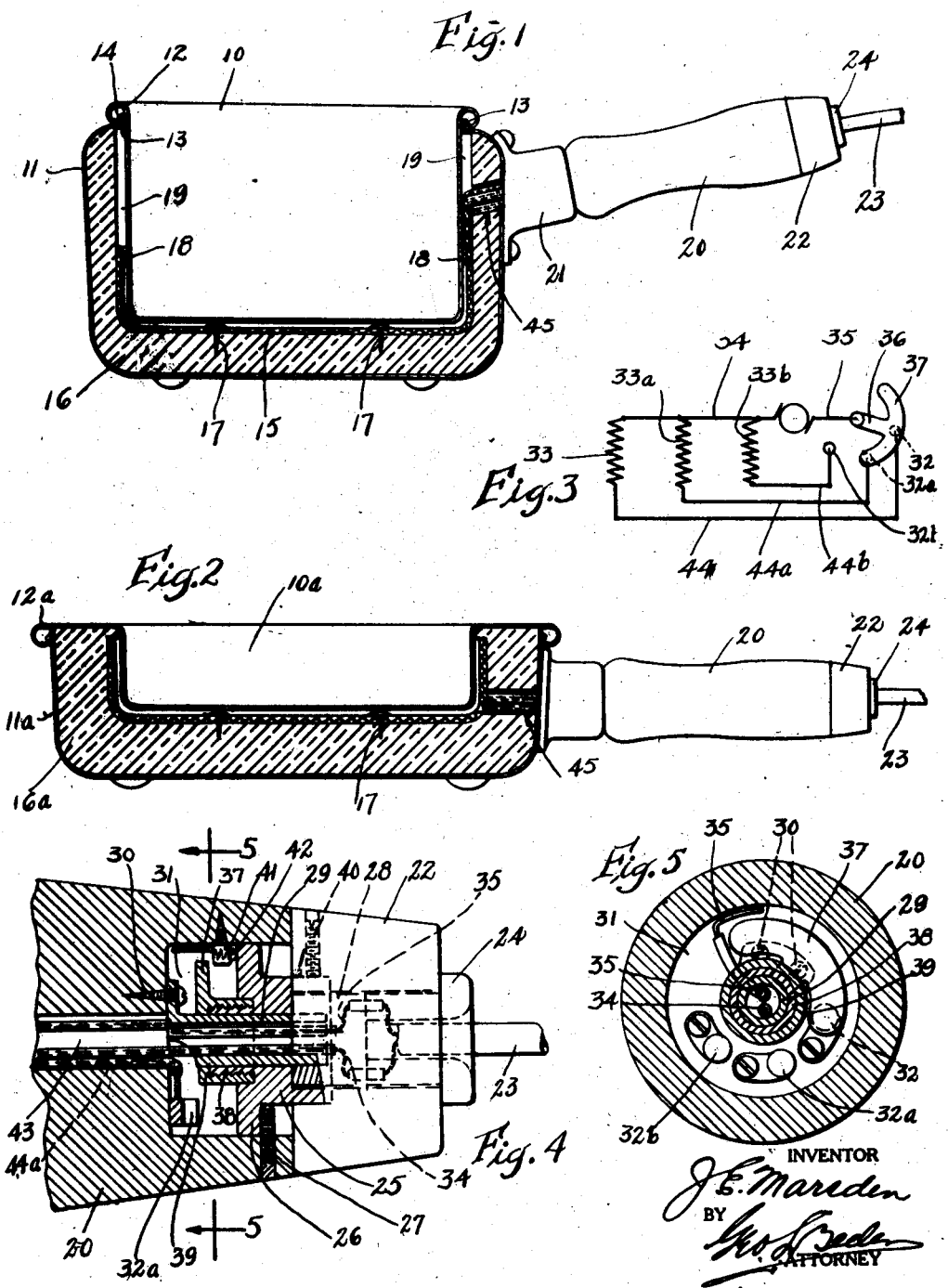

1,597,241

UNITED STATES PATENT OFFICE.

JOHN E. MARSDEN, OF PHILADELPHIA, PENNSYLVANIA.

ELECTRIC COOKING UTENSIL.

Application filed July 27, 1925. Serial No. 46,251.

This invention relates to apparatus adapted for cooking purposes and has particular reference to electric cooking utensils and to tables or supports to be used in conjunction therewith.

Among the objects of this invention is to provide an electric cooking utensil comprising means for heating the same combined with insulating means for conserving the heat so as to permit the device to function at a maximum efficiency.

Another object of this invention is to provide a cooking utensil comprising a plurality of parts having novel engagement with each other along the rim thereof whereby a strong and simple connection is provided, insulating means being arranged for conserving the heat imparted to the utensil, said insulating means comprising an air space extending along the top of the utensil.

Another object of this invention is to provide an electric cooking utensil having novel switch means for controlling the heat imparted to said utensil, said switch means being operative by a member mounted upon the handle of the utensil in a convenient and efficient manner.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1 is a vertical section of a portion of a cooking utensil, with parts in elevation.

Fig. 2 is a vertical section of a portion of a modified electric cooking utensil, with parts in elevation.

Fig. 3 is a diagram showing the electric wiring within said utensil whereby the quantity of current fed to the heating coil may be regulated.

Fig. 4 is an enlarged view with parts in section of a portion of the handle showing the details of the switch mechanism.

Fig. 5 is a section on the line 5—5 of Fig. 4.

Referring now more specifically to the drawings I show an electric cooking utensil comprising an inner member or container 10 and an outer member or casing 11 which have connection with each other preferably along the rim of the utensil as by means of a bead 12 provided upon one of said parts and preferably along the rim of the container 10, while the casing 11 is provided with a flange 13 arranged to enter said bead and having hook means 14 to automatically snap into engagement with the free or inner edge of said bead. It will be observed that said rim operates as an important stiffening structure for the utensil, improves the appearance thereof, and renders the utensil more readily operative as for the purpose of pouring a fluid therefrom. Moreover, by means of the connection between the inner and outer members of the utensil as has just been described, these parts may be joined together with a minimum of labor and expense. If desired, however, a certain degree of soldering or welding may be resorted to.

The inner and outer members are constructed to provide a space therebetween within which is positioned an electric heating coil 15 and suitable insulation means 16. Thus said heating coil lies in relative proximity to the container 10, while the insulating means lies without said heating coil and said container and in contact with the casing 11. Preferably the heating coil lies in proximity solely to the lower portion of the cooking utensil as, for instance, along the bottom thereof and part way up along the sides. It is secured in position in any suitable manner as, for instance, by means of the fasteners 17 which are driven into the insulation 16. A small space may be observed between the container and said heating coil by means of suitable spacing means as shown at 18 to render the temperature along the adjacent portions along the container more uniform. The means for insulating the container 10 may comprise air spaces arranged in any suitable manner and co-operating with the insulation 16. Thus I show an air space 19 positioned between said container and said insulation and extending around the upper portions of said container. It will thus be observed that while I thus secure an effective insulation about said container, that the weight of the utensil is retained at a minimum, and this air space is to be construed in its broad sense with these objects in view.

Means are provided to facilitate the ready lifting of the utensil as, for instance, a handle 20 which is secured to the utensil in any suitable manner as by means of an anchor portion 21 which may be riveted or otherwise secured to the outer casing of the utensil. Said handle is positioned at a side of the utensil and may be extended to lie at a slight upward inclination to be readily grasped by the operator. Suitable means is provided for controlling the flow of current to said heating coil and arranged in convenient position to be readily operated for this purpose. Preferably, however, I position said means within said handle and provide the same with a knob 22 or the like whereby said switch mechanism may be operated from without and from a point adjacent to said handle. The circuit with the heating coil is made as by means of a lead 23 connected to the cooking utensil at any convenient portion and preferably at the end of said handle as by means of a plug 24. The knob 22 is mounted for rotation co-axially with said handle and is secured thereto in any suitable manner as by means of a sleeve 25 having a flange 26 which is engaged by a pin or screw 27. Said knob is hollow to receive a socket 28 which is made of suitable insulation material such as bakelite or the like and is supported by means of a bracket or sleeve 29 which may be molded thereinto and which is secured to said handle by means of a screw 30. It will thus be seen that the knob 22 is rotatable independently of said socket which is preferably borne in stationary position by said sleeve as aforesaid. The handle is provided with a chamber 31 within which certain of the parts described may be inclosed and is of sufficient size to contain a plurality of contacts 32, 32$^a$, and 32$^b$ which are connected with the heating coil in such manner that current may be supplied thereto to obtain three different temperatures. More specifically, said heating coil is composed of a plurality of sections 33, 33$^a$, and 33$^b$ which are joined individually with the respective contacts whereby said sections may be operated in any combination desired so as to secure a relatively low or warm temperature when current is fed to one of the sections, a medium temperature when current is fed to two sections, and a maximum temperature when current is fed to all three sections together. The electric circuit is made by means of a wire 34 to which said sections of the heating coil are joined individually and with the source of current, and a wire 35 which joins said source of current with the switch mechanism. Thus the wire 35 is connected to a switch member 36 which is provided with an arm 37 of sufficient size to engage all three of the contact members simultaneously if it is desired to obtain the maximum temperature as aforesaid. However, should the operator wish to obtain only a medium temperature then the switch is moved into the position shown in Fig. 3 in which the switch member completes the circuit from the source of current only with two of the sections by completing the circuit with only two of the contacts. Should a relatively low temperature be desired then the switch member is moved to the position shown in Fig. 5 in which said member completes the circuit through but one of the contacts and but one section of the heating coil as described hereinbefore. Said switch member is movable by rotation of the knob 22 for engagement with the various contacts as stated and is supported upon the sleeve or anchor member 25 to an annular flange 38 extending therefrom by means of the threads 39. To facilitate assemblage of the parts the anchor member 25 may be detachable from the knob 22 and may be arranged for engagement therewith as by means of a screw 40. To provide for a continuous electrical contact with the switch member I arrange a spring pressed device 41 which is fastened to the handle and embodies a ball 42 or the like which has continuous resilient contact with the flange 26 of said anchor member regardless of the rotational position thereof. The wire 35 has engagement with said spring pressed device as by being passed through the sleeve 29 from which it is insulated by certain tubular insulation. Similarly the wire 34 extends from the other terminal of said socket through the sleeve 29 and through the tubular opening 43 which extends axially through said handle into engagement with the heating coil as described hereinbefore. It will now be seen that the plug 24 is arranged for ready insertion through the knob 22 for the purpose of engagement with the socket 28 whereby the circuit is made and current supplied to one or more sections of the heating coil as may be regulated by means of the knob 22, said knob being rotatable for adjustment of the temperature of the cooking utensil without in any way altering or affecting the plug and socket connection.

After the cooking is done the plug may be readily detached from the socket in a conventional manner so that the lead 28 will be out of the way and then the utensil may be grasped by means of the handle and used conveniently in any manner or for any purpose. It will be observed that the construction thus provided is a particularly neat and desirable one and is entirely safe against the possibility of short circuit since the exposed parts are constructed of insulating material, and where at certain points screws are used the openings at the heads of said screws are filled with non-conducting material. Various wires through which the circuit is completed are carefully insulated from each other and may be provided with individual tubular insulation as may be observed in connection with the wires 34, 45, and the wires 44, 44ª, and 44ᵇ which join the various sections or resistances that compose the heating coil with their respective contacts.

As a modification of my cooking utensil I show the same in Fig. 2 arranged in relatively flat form as for the purpose of receiving a cake or the like, the handle 20 being substantially horizontal, no air space being observed without the container 11ª, but a thicker mass of insulation 16ª being provided in lieu thereof. In other respects the two utensils are substantially similar, being provided with functionally similar rim construction and with a heating coil located in substantially similar position, openings 45 being observed through the insulation adjacent to the handle through which the wiring is passed from the handle to the heating coil for completing the circuit therethrough.

I claim:

1. In an electric cooking utensil, the combination of a container, a heating coil for same, insulation surrounding the heating coil, a casing inclosing the insulation, a handle attached to the casing, and switch means in the handle comprising a knob at the end thereof for controlling the flow of current to the heating coil.

2. The combination as in claim 1 wherein said coil comprises a plurality of sections and said switch is operative for controlling the flow of current to said sections in any combination of sections desired.

3. The combination as in claim 1 wherein said coil comprises a plurality of sections, and said switch comprises a plurality of contacts engageable individually with said sections, and a switch member arranged to contact one or more of said contacts as desired to complete the circuit through one or more of said sections.

4. In an electric cooking utensil, the combination of a container, a heating coil to impart heat thereto, means including a handle co-operating with said container, a switch mounted on the handle to control the current through said coil, said switch being operative by a hollow knob, and an electrical connection for said switch within said knob, said knob being rotatable while said electrical connection is mounted against rotation.

In testimony whereof I affix my signature.

JOHN E. MARSDEN.